United States Patent
Kwan (10) Patent No.: US 8,996,498 B2
(45) Date of Patent: *Mar. 31, 2015

(54) ADVANCED URLS FOR WEB NAVIGATION

(71) Applicant: International Business Machines Corporation, Armonk, NY (US)

(72) Inventor: Derek Kwan, Richmond Hill (CA)

(73) Assignee: International Business Machines Corporation, Armonk, NY (US)

(*) Notice: Subject to any disclaimer, the term of this patent is extended or adjusted under 35 U.S.C. 154(b) by 95 days.

This patent is subject to a terminal disclaimer.

(21) Appl. No.: 13/921,111

(22) Filed: Jun. 18, 2013

(65) Prior Publication Data

US 2013/0282866 A1 Oct. 24, 2013

Related U.S. Application Data

(63) Continuation of application No. 11/222,321, filed on Sep. 8, 2005, now Pat. No. 8,495,053.

(51) Int. Cl.
  *G06F 17/30* (2006.01)
  *H04L 29/06* (2006.01)

(52) U.S. Cl.
  CPC .......... *H04L 65/80* (2013.01); *G06F 17/30876* (2013.01); *G06F 17/30899* (2013.01)
  USPC ...................................................... 707/708

(58) Field of Classification Search
  CPC ................ G06F 17/30876; G06F 17/30899
  See application file for complete search history.

(56) References Cited

U.S. PATENT DOCUMENTS

| 6,037,934 | A  | 3/2000  | Himmel    |
|-----------|----|---------|-----------|
| 6,128,650 | A  | 10/2000 | De Vos    |
| 6,161,127 | A  | 12/2000 | Cezar     |
| 6,208,995 | B1 | 3/2001  | Himmel    |
| 6,211,871 | B1 | 4/2001  | Himmel    |
| 6,212,522 | B1 | 4/2001  | Himmel    |
| 6,219,679 | B1 | 4/2001  | Brisebois |
| 6,314,423 | B1 | 11/2001 | Himmel    |
| 6,549,941 | B1 | 4/2003  | Jaquith   |

(Continued)

FOREIGN PATENT DOCUMENTS

| CA | 2490682    | 12/2004 |
|----|------------|---------|
| EP | 0921481 A2 | 6/1999  |
| EP | 1338982 A1 | 8/2003  |

(Continued)

OTHER PUBLICATIONS

Oct. 29, 2007_NonfinalOfficeAction.

(Continued)

*Primary Examiner* — Dinku Gebresenbet
(74) *Attorney, Agent, or Firm* — Anthony V S England; William H Steinberg (57) ABSTRACT

A method, computer program product, and system for providing advanced downloading of Uniform Resource Locators (URLs) for a WEB browser running on a computer. The system is capable of providing a WEB browser with Uniform Resource Locators (URLs). The system comprises a client computer and a server. The client computer includes the WEB browser for use by a user and includes a URL component. The server provides WEB data to the client computer. The server includes a URL downloader, which is responsive to the URL component for downloading the URLs to the client computer.

19 Claims, 6 Drawing Sheets

(56) References Cited

U.S. PATENT DOCUMENTS

2003/0074415 A1 4/2003 Bates
2003/0123640 A1 7/2003 Roelle

FOREIGN PATENT DOCUMENTS

| GB | 2333617 A | 7/1999 |
|---|---|---|
| GB | 2365150 A | 2/2002 |
| WO | WO 0072193 A1 | 11/2000 |

OTHER PUBLICATIONS

Jan. 29, 2008_NonfinalOfficeActionResponse.
May 30, 2008_FinalOfficeAction.
Aug. 27, 2008_RCE.
Oct. 3, 2008_NonfinalOfficeAction.
Jan. 6, 2009_NonfinalOfficeActionResponse.
Mar. 18, 2009_FinalOfficeAction.
May 5, 2009_AmendmentAfterFinal.
May 15, 2009_AdvisoryAction.
Aug. 18, 2009_AppealBrief.
Aug. 18, 2009_NoticeOfAppeal.
Nov. 24, 2009_Examiner'sAnswerToAppealBrief.
Jan. 25, 2010_ReplyBrief.
Dec. 14, 2012_PatentBoardDecision.
Mar. 25, 2013_NoticeOfAllowance.
Jun. 4-8, 2013_CorrectedNoticeOfAllowability.
Canadian Patent Application 2490682 Office Action Sep. 9, 2010.
IBM TDB vol. 41, No. 01, Jan. 1, 1998, "Internal Placemarks for Uniform Resource Locator Bookmark Operations".

ADVANCED URLS FOR WEB NAVIGATION

CROSS REFERENCE TO RELATED APPLICATION

This is a continuation of, and hereby claims the benefit of the priority date of, application Ser. No. 11/222,321, which was filed Sep. 8, 2005.

FIELD OF THE INVENTION

The present invention relates to information retrieval in computer networks, and more particularly to a method and system for advanced downloading of URLs for WEB navigation.

BACKGROUND OF THE INVENTION

The Internet provides for the collective resources available within large networks to be shared among users. The growth of the Internet has allowed sharing of computer resources to be brought to wide audiences. For many companies, Internet sites are an integral part of the business, offering customers detailed information on available products, providing customers with a direct means of making purchases, and serving as a conduit between technical support operations and customers in need of service.

The World Wide Web ("the WEB") is the Internet's multimedia information retrieval system. Client machines engage in transactions with WEB servers using the Hypertext Transfer Protocol (HTTP), which is a known protocol providing users with access to files (e.g., text, graphics, sound, or video) using the Hypertext Markup Language (HTML). HTML provides for document formatting and allows the developer to specify links to other files, often located on other servers. Network paths to servers are identified by a Uniform Resource Locator (URL) having a special syntax for defining a network connection.

Information is generally retrieved using an HTML compatible browser, such as Microsoft Internet Explorer™, on a client machine. WEB browsers have become the primary interface for access to most Internet services. When the user of the browser enters a URL, the client PC issues a request to a naming service to map the hostname specified in the URL to a network IP address where the server is located. Using the IP address, the browser establishes a connection to the server and retrieves the requested file, which is usually an HTML encoded WEB page.

Entering a URL into the address field of a WEB browser can be a difficult task for many users, particularly when they are unfamiliar with the WEB site they are visiting. While the URL for a WEB page can be brief (e.g., www.ibm.com), sub-pages can have lengthy URLs in what may appear to be an arcane syntax. Some versions of Microsoft Internet Explorer™, Netscape Navigator™, and Mozilla™ have added features, such as history and auto-complete features that remember URLs previously visited by the user. The history and auto-complete features provide the completed URL to the user as a selection when the user either begins to enter a URL in the address field that begins with the same characters or chooses to browse a history window. However, these conventional WEB browser features require that the user has previously visited the URL the user is seeking, offering little help if the user has never visited the WEB page before. Additionally, these conventional WEB browser features fail to provide URLs to the user in an easy to navigate hierarchy.

In view of the problems associated with conventional WEB browsers, it would be desirable to have a WEB browser that already knows the URLs of pages a user might wish to visit and provides these URLs to the user in a way that is easy to understand, easy to navigate, and easy for the user to select the URL being sought.

SUMMARY

Embodiments of the present invention provide a method, computer program product, and system for providing a WEB browser on a computer of a user with advanced downloading of URLs. In one aspect, a WEB browser feature is provided so that the WEB browser already knows the URLs of pages a user might wish to visit and provides these URLs to the user in a way that is easy to understand, easy to navigate, and easy to select.

In accordance with one aspect of the present invention, a method for providing downloading of URLs for a WEB browser running on a computer is provided. The method utilizes a server to query the WEB browser when a user arrives at a WEB site hosted on the server to see if a URL component exists on the computer and provides the URL component with a current set of URLs associated with the WEB site, if the URL component exists on the computer. The method may further provide the user with an option to install the URL component on the computer if the URL component is not already installed on the computer and the method installs the URL component on the computer if the user chooses to install the URL component. The method may also ask the user to select the URLs that the user wishes to download to compile the set of URLs provided to the URL component before providing the URL component with the current set of URLs associated with the WEB site. The method may further ask the user whether or not to download the set of URLs associated with the WEB site before providing the URL component with the current set of URLs associated with the WEB site and making the step of providing the URL component with the current set of URLs associated with the WEB site conditional on a response from the user. The function of asking the user whether or not to download the set of URLs associated with the WEB site may be performed by an item selected from the group consisting of the WEB browser, the URL component, and a servlet that is installed on the server. In one alternative, the URL component and a set of URLs may be provided to the computer in advance when a software application is installed. The process of providing the URL component with the current set of URLs associated with the WEB site may be performed automatically using metatags in HTML code of the WEB site. The method may further comprise the step of storing the set of URLs provided to the URL component in a data file associated with the WEB browser on the computer of the user. The set of current URLs can be stored in the data file selected from the group consisting of a history data file, an auto-complete data file, and a site-map data file. The method may further monitor keystrokes of the user when the user types a URL in an address field of the WEB browser and present the user with a selection of URLs that begin with the keystrokes the user has entered so far, the selection of URLs taken from the current set of URLs provided to the URL component. The process of presenting the user with the selection of URLs may be performed in a top down fashion such that the user navigates through a directory tree of the WEB site one level at a time, beginning one level below the URL the user has entered into the address field, to select a URL that the user wishes to arrive at from the selection of URLs. The method functions even if the user has not previously visited the WEB site with the WEB browser that the user is using.

In accordance with another aspect of an embodiment of the present invention, there is provided a computer program product having a computer readable medium tangibly embodying computer executable instructions for providing downloading URLs for a WEB browser running on a computer. The computer program product comprises computer executable instructions for utilizing a server to query the WEB browser when a user arrives at a WEB site hosted on the server to see if a URL component exists on the computer and computer executable instructions for providing the URL component with a current set of URLs associated with the WEB site. The computer program product may further include computer executable instructions for providing the user with an option to install the URL component on the computer, if the URL component is not already installed on the computer and computer executable instructions for installing the URL component on the computer if the user chooses to install the URL component.

In accordance with yet another aspect of an embodiment of the present invention, there is provided a system for providing a WEB browser with URLs. The system comprises a client computer and a server. The client computer includes the WEB browser for use by a user and a URL component. The server provides WEB data to the client computer and includes a URL downloader, the URL downloader being responsive to the URL component for downloading the URLs to the client computer. The URL component may comprise plug-in installed on the client computer. The plug-in may be downloadable from the server. The URL component may be downloaded and installed in response to a user input on the client computer. The URL component may store the URLs in a data file associated with the WEB browser on the client computer. The data file may be selected from the group consisting of a history data file, an auto-complete data file, or a site-map data file. The URL component may be an application that runs in the WEB browser or an integral part of the WEB browser.

Other aspects and features of embodiments of the present invention will become apparent to those of ordinary skill in the art upon review of the following description of specific embodiments of the invention in conjunction with the accompanying figures.

BRIEF DESCRIPTION OF THE DRAWINGS

Reference will now be made to the accompanying drawings which show, by way of example, embodiments of the present invention, and in which.

Similar references are used in different figures to denote similar components.

DETAILED DESCRIPTION OF THE EMBODIMENTS

The following detailed description of embodiments of the present invention does not limit the implementation of the embodiments to any particular computer programming language or hardware architecture. The computer program may be implemented in computer executable instructions in any suitable computer programming language. According to one embodiment, the invention is implemented in the C/C++ computer programming language (or may be implemented in other computer programming languages in conjunction with C/C++). Any limitations presented would be a result of a particular type of operating system, computer programming language, or data processing system and would not be a limitation of the embodiments described herein.

Figure 1:
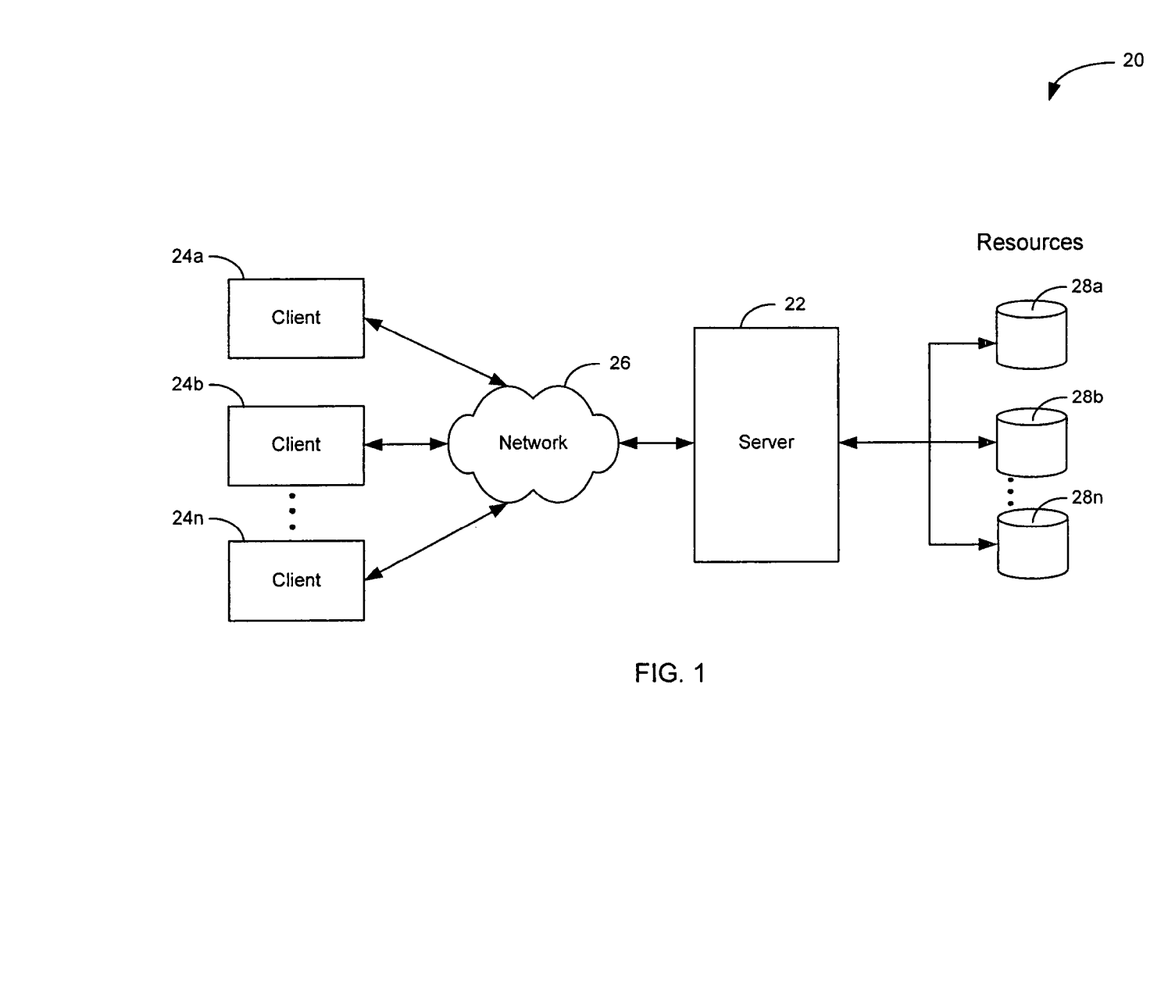
FIG. 1 is a schematic diagram of a computer system suitable for practicing the present invention.

Referring to FIG. 1, a computer system 20 is shown that is suitable for implementing the present invention. The computer system 20 generally comprises a server 22 and a number of clients 24, indicated individually as 24a, 24b . . . 24n. Server 22 and clients 24 may be interconnected by a network 26. Server 22 is modeled as a number of server components including an application or business logic server, a graphical user interface server, a database server or resource manager, or an Internet server. Clients 24 may comprise computers, data processing systems, workstations, handheld portable information devices, or computer networks. Clients 24 may be the same or different. In one example, network 26 comprises the Internet or the Web. In such a case, client computers 24 are equipped with WEB browser programs such as Microsoft Internet Explorer™, Netscape Navigator™ or Mozilla™. Server 22 is equipped with appropriate HTTP server software, such as the WebSphere™ product from IBM™. In another example, network 26 comprises a wireless link, a telephone communication, a radio communication, or computer network (e.g. a Local Area Network (LAN) or a Wide Area Network (WAN)).

Computer system 20 may further include resources 28, indicated individually as 28a, 28b . . . 28n, connected to server 22. Resources 28 may comprise storage media, mainframes such as the S/390 or AS/400 platforms from IBM™, databases (e.g., a relational database such as the DB2™ product from IBM), a set of eXtensible Markup Language (XML) documents, a directory service such as a Lightweight Directory Access Protocol (LDAP) server, or backend systems. The interface between server 22 and resources 28 may comprise a LAN, the Internet, or a proprietary interface. Resources 28 are accessed by server 22 and clients 24. Server 22, clients 24, and resources 28 may be located remotely from one another or may share a location.

Figure 2:
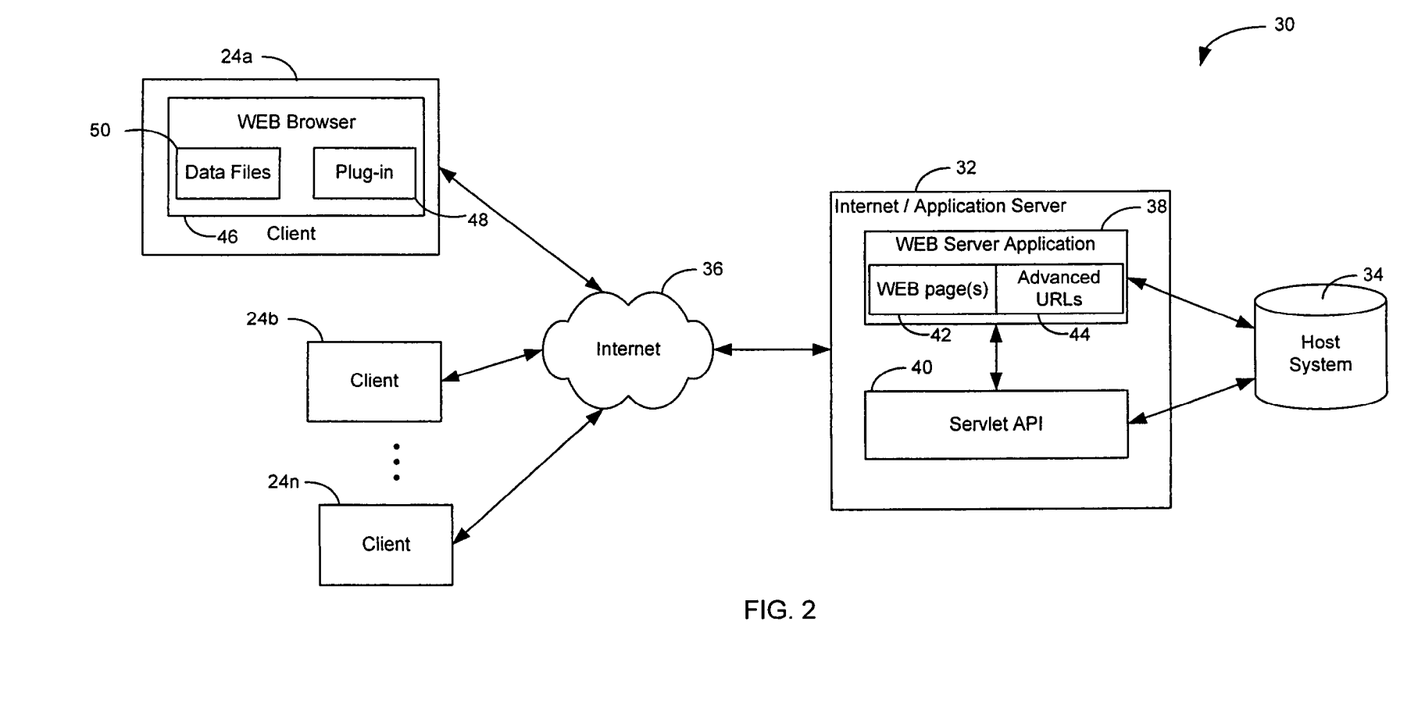
FIG. 2 is a schematic diagram of an exemplary computer system suitable for utilizing the present invention.

Reference is now made to FIG. 2, which shows a computer system 30 suitable for implementing the present invention. Computer system 30 generally comprises a server 32, a host system 34, and clients 24, shown individually as 24a, 24b . . . 24n (similar to the clients 24 described above with reference to FIG. 1). In one configuration, host system 34 may be an S/390 or AS/400 mainframe from IBM™. Clients 24 connect to server 32 via the Internet 36. In one implementation, server 32 comprises an Internet or application server. A user interface (not shown) is presented to clients 24 using HTML based pages, for example. Business logic may be implemented on server 32 using Enterprise JavaBean components (EJB) for the object layer. The server 32 runs a WEB server application 38 and a servlet 40. WEB server application 38 includes WEB pages 42 that are provided to clients 24 and a collection of advanced URLs 44 that are provided to clients 24. Clients 24 comprise workstations running a Windows™ family operating system such as Windows XP™ from Microsoft™. Client machines 24 run a WEB browser 46 such as Microsoft Internet Explorer™ or Netscape Navigator™, as shown in connection with client 24a. All further examples of client machines running WEB browser 46 will be discussed in relation to client 24*a*, however it is to be understood that any of clients 24 may run WEB browser 46. WEB browser 46 has access to a plug-in 48 that is installed on client 24*a* and data files 50 that the WEB browser maintains on the client. In one example, plug-in 48 may be an applet.

Figure 3:
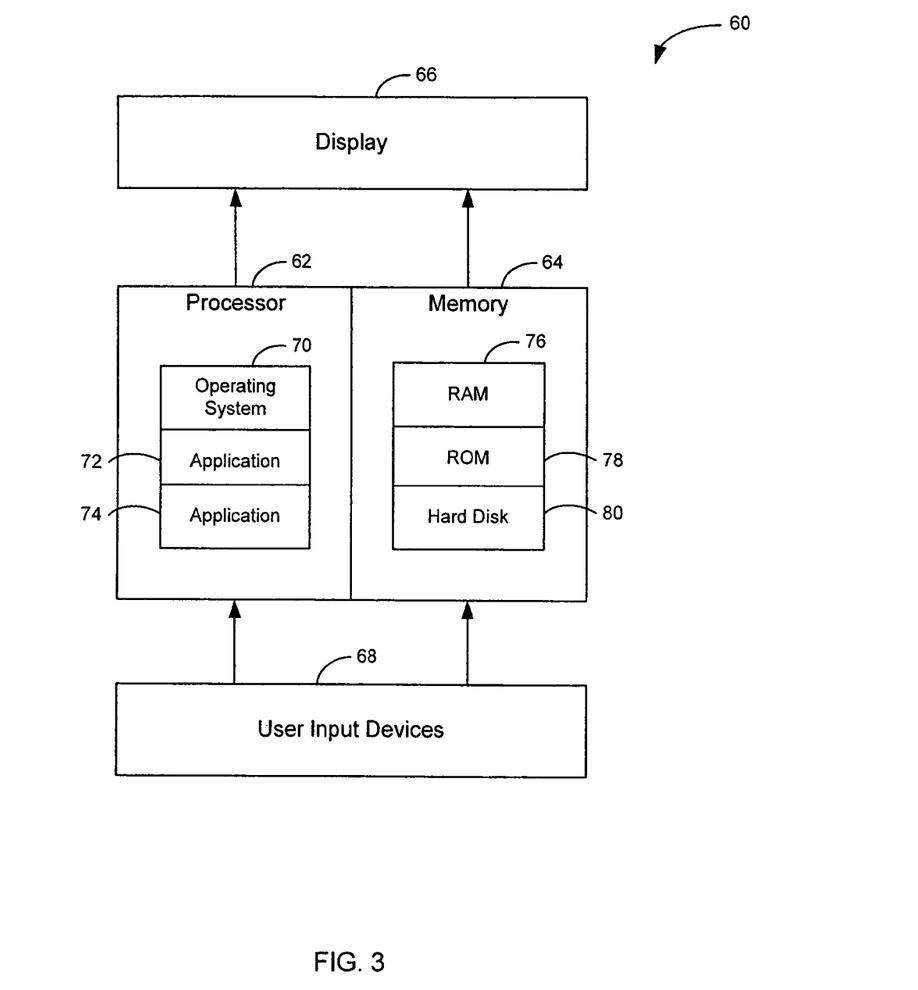
FIG. 3 is a block diagram of a data processor for the computer system of FIG. 1 or FIG. 2.

Reference is next made to FIG. 3, which shows a data processor 60 for computer system 20 (FIG. 1) or 30 (FIG. 2). Data processor 60 generally comprises a processor 62, a memory 64, a display 66, and user input devices 68. User input devices 68 may include a keyboard and a pointing device (e.g. a mouse or touch screen), and a communication interface (not shown) for communicating with network 26 (FIG. 1) or 36 (FIG. 2). An operating system 70 and application programs 72 and 74 may run on processor 62. Memory 64 comprises Random Access Memory (RAM) 76, Read Only Memory (ROM) 78, and a hard disk 80. Data processor 60 may comprise a client or a server.

When a user navigates a WEB site hosted on server 32 using one of clients 24, the user often encounters a WEB site design that is different from other WEB sites the user may have visited in the past. The freedom WEB designers have in designing a WEB site gives WEB designers tremendous control and versatility to create unique and powerful sites. However, this freedom also results in WEB sites being substantially different from one another, often making it difficult for the user to locate the desired information. Search functions are sometimes available, but often yield inaccurate or painfully voluminous results.

In one aspect, the present invention provides for the advanced downloading of advanced URLs 44 into browser data files 50 such that browser 46 on client 24*a*, when in use by the user anticipates the complete path of the URL that the user is typing and allows the user to select an appropriate URL, just as though the user had previously visited all of WEB pages 42 of Internet server 32 that the user is currently navigating. Browser data files 50 may comprise browser history, auto-complete, and/or site-map data files.

Figure 4:
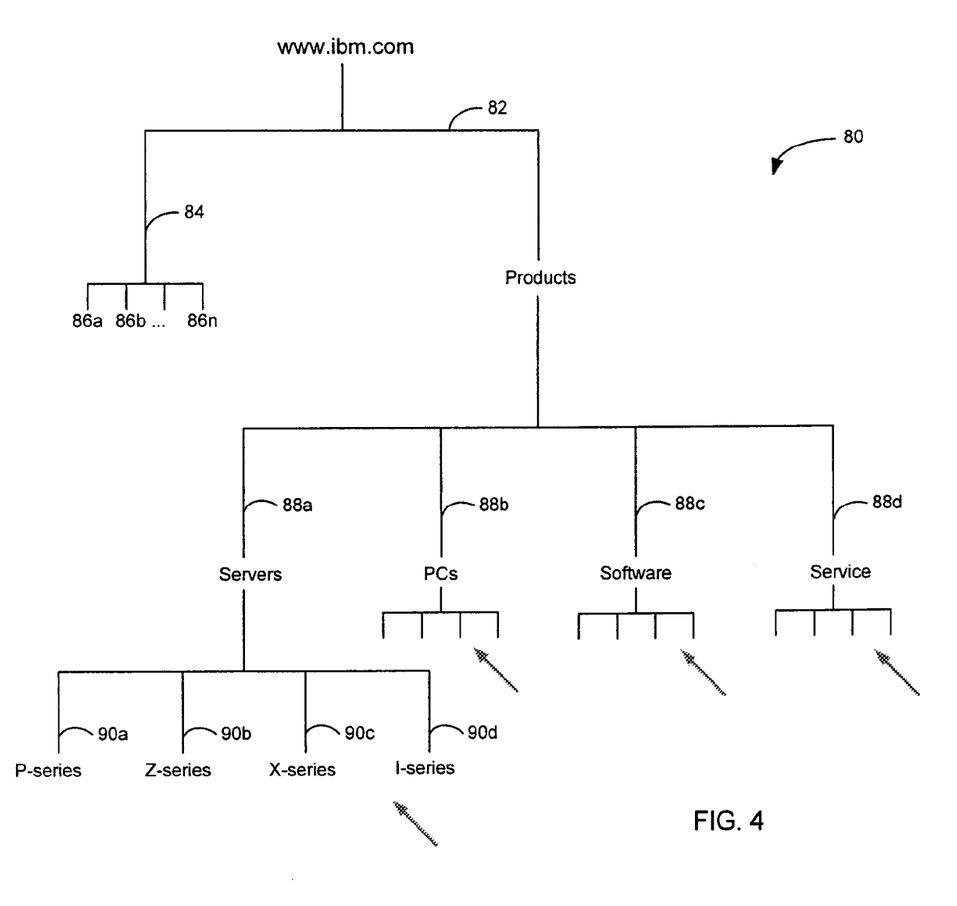
FIG. 4 is an example of a WEB site directory tree structure through which a user may navigate.

Referring to FIG. 4, a WEB site directory tree or hierarchy 80 is shown, which represents the layout of a WEB site hosted on Internet server 32. For this example, the WEB site resides at www.ibm.com. The site address www.ibm.com is used for the purpose of an example only is in no way representative of the actual content of www.ibm.com. Directory tree 80 has a top level representing the home page www.ibm.com. From the top level of the home page, a user may select a link that takes the user to a branch 84 or a branch 82. Branch 84 has a number of sub-branches 86, individually indicated as 86*a*, 86*b* . . . 86*n*. Branch 82 is selected when a user clicks on a "products" link from the home page. Branch 82 has a number of sub-branches 88, indicated individually as 88*a*, 88*b*, 88*c*, and 88*d*. Each of sub-branches 88 has a number of leaves. For example, if the user selects "servers" from sub-branch 88*a*, the user is presented with leaves 90, individually indicated as 90*a*, 90*b*, 90*c*, and 90*d*. Character 90*a* represents a WEB page dedicated to P-series servers, character 90*b* represents Z-series servers, character 90*c* represents X-series servers, and character 90*d* represents I-series servers. In the present example, if the user visits www.ibm.com, Internet server 32 presents the user with an option to download a selected set of the URLs for the www.ibm.com WEB site. After the downloading is complete, and during all subsequent visits to www.ibm.com, the user has a list of pre-defined URLs to choose from that are available either in an address field of browser 46 as the auto-complete function operates or in a site-map window that functions similarly to the history window of browser 46. This allows the user to navigate www.ibm.com in an easier, quicker, and more efficient manner.

In another aspect of the present invention, the functioning of the auto-complete and site-map window features of the browser 46 are modified. Conventional auto-complete features in WEB browsers, such as browser 46, operate such that, as the user begins to type a URL into the address field of WEB browser computer 24*a*, the user offered a list of URLs to the user that begin with the same characters that the user has entered. According to this aspect, WEB browser 46 provides an auto-complete function where all potential URLs that fall below the level of the URL that the user has entered so far in tree 80 of the WEB site are shown to the user, one level at a time, such that the user can "drill down" through tree structure by clicking on each branch, one at a time. For the example depicted in FIG. 4, when a user arrives at www.ibm.com and begins to type "www.ibm.com/products" in the address field of browser 46, the browser presents the user with a selection comprising all the products that exist in directory tree 80 below the products level (e.g., choose from servers at 88*a*, PCs at 88*b*, software at 88*c*, or service at 88*d*). According to this aspect of the present invention, browser 46 can restrict choices to one of those four options and not present the user with the options below that level in directory tree 80 until the user chooses one of those four options, so as not to confuse the user. If the user chooses "servers", the user is then presented with the next level of options that are available one level below (e.g., the user is then able to select between different server lines, such as P-series at 90*a*, Z-series at 90*b*, X-series at 90*c*, and I-series at 90*d*). If the user selects P-series, browser 46 then arrives at the URL http://www.ibm.com/products/servers/p-series/index.html, and presents the corresponding WEB page 42 to the user in WEB browser 46. If the user had never visited www.ibm.com before, finding such a URL may have presented a difficult task. Additionally, if the conventional auto-complete feature of the user's browser 46 had been populated with all URLs from www.ibm.com and the "drill-down" feature of the present invention was not provided, the moment the user typed www.ibm.com/products, the user would have been presented with a very large list of possible completed URLs representing all destinations in the tree below the products level. This would be confusing and take much time to look through. Implementation of the present invention may be easiest with WEB sites that have a clean hierarchy or directory structure 80. A confusing or complicated hierarchy should be simplified before implementing the present invention. Alternatively, a virtual directory may be placed on Internet server 32.

The downloading of advanced URLs 44 into browser 46 history, auto-complete, and/or site-map data files 50 may be accomplished in a number of ways. The URLs may be delivered according to a passive method that requires no intervention by the user. Plug-in 48 is installed on user's machine 24*a* such that the plug-in extracts metatags from an HTML document delivered to the user's machine by server 32. Plug-in 48 populates browser 46 data files 50 in a way that is seamless to the user of the browser. In another variation, the advanced URLs 44 are delivered in an active manner that allows the user of browser 46 on client 24*a* to interact with server 32 and either approve or disapprove of downloading of the advanced URLs or select specific URLs for downloading. The active manner can make use of servlet API 40 that may be installed on the internet or application server 32. Servlet 40 may be responsible for delivering advanced URLs 44 to users who visit the WEB page 42 hosted by Internet server 32. A request is issued from plug-in 48 to servlet 40 requesting the downloading of the advanced URLs 44 and the servlet responds by granting the request and supplying the advanced URLs. Alternatively, when the user visits WEB page 42, servlet 40 notifies plug-in 48 that advanced URLs 44 are available. Plug-in 48 may then ask the user if the user wishes to download some or all of the advanced URLs 44. Servlet 40 then supplies all of the advanced URLs 44, some of the advanced URLs, or none of the advanced URLs to plug-in 48 based on the user's response. In another variation, servlet 40 is responsible for translating complex tree structures into more comprehensible directory trees, but server 32 alone may be responsible for delivering plug-in 48 and advanced URLs 44 to client 24*a*. In yet another variation, the advanced URLs 44 are added to the user's browser 46 during the installation of new software. For example, if the user purchases and installs a DB2™ product from IBM, the installation routine of the DB2™ product may ask the user if the user wishes to install plug-in 48 and/or advanced URLs 44 related to the DB2™ product. If the user elects to install advanced URLs 44 related to the software product, the next time the user visits www.ibm.com, the user is able to make use of advanced URLs as described above to retrieve information or obtain customer support related to the DB2™ product. In a further variation, the advanced URLs 44 are available from a search engine such as Google™. If a user performs a search for a product that is found on the www.ibm.com WEB site, Google™ displays the www.ibm.com hit and offers plug-in 48 and/or advanced URLs 44 to the user.

Figure 5:
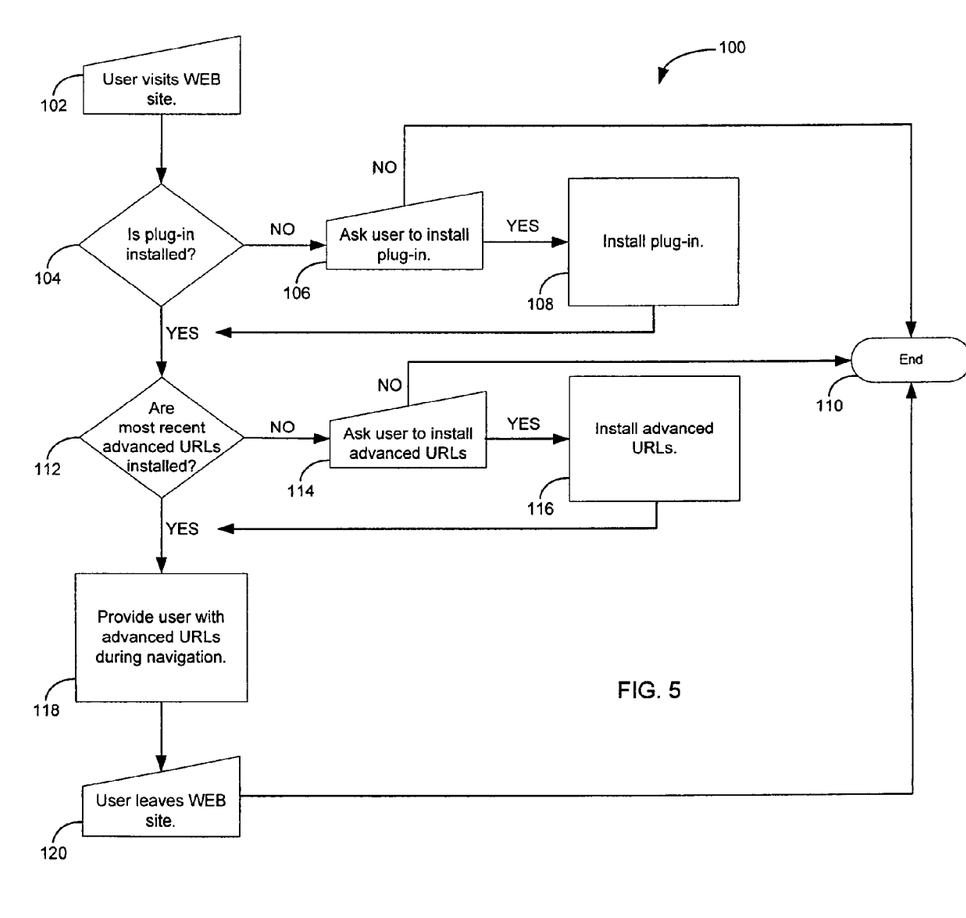
FIG. 5 is a flow diagram illustrating a process in accordance with one aspect of the present invention.

Reference is next made to FIG. 5, which shows an example in flowchart for a process 100 that implements the active delivery method for the downloading of advanced URLs 44 according to the present invention. Process 100 comprises a user input stage 102, a decision stage 104, a user input stage 106, an action stage 108, an end stage 110, a decision stage 112, a user input stage 114, an action stage 116, an action stage 118, and a user input stage 120. Process 100 begins at input stage 102 when the user visits WEB page 42 on Internet server 32. At stage 104, Internet server 32 checks client machine 24*a* to see if the appropriate plug-in 48 is installed. If plug-in 48 is installed, process 100 proceeds to stage 112. If plug-in 48 is not installed, process 100 proceeds to stage 106 and asks the user if plug-in 48 is to be installed on client machine 24*a*. If the user does not want plug-in 48 installed on client machine 24*a*, process 100 terminates at end stage 110. If the user elects to install plug-in 48, process 100 proceeds to stage 108, installs plug-in 48, and further proceeds to stage 112. Alternatively, another example of a URL component to provide advanced URLs 44 is available by way of code integrated as part of the browser rather than by use of plug-in 48. At stage 112, Internet server 32 checks to see if advanced URLs 44 for WEB page 42 have already been downloaded to client 24*a* and if the client has the latest version of the advanced URLs (e.g., have browser 46 data files 50 already been populated with the latest version of the advanced URLs of the WEB page). If the downloading of URLs 44 has already occurred and the newest version of the advanced URLs is present, process 100 proceeds to the stage 118. If the downloading of advanced URLs 44 has not yet occurred or the advanced URLs are not up to date, process 100 proceeds to stage 114 and asks the user if the advanced URLs of WEB page 42 are to be downloaded. At stage 114, the user may also elect to download select URLs (e.g., some of URLs 44, but not others). If the user elects to download some or all of the advanced URLs, process 100 proceeds to stage 116 and servlet 40 on Internet server 32 provides some or all of the advanced URLs to WEB browser 46 for storage in data files 50. Alternatively, servlet 40 may translate complex WEB site directory structures into simpler structures and compile advanced URLS 44 or server 32 alone may be responsible for providing some or all of the advanced URLs to WEB browser 46 for storage in data files 50. Process 100 then proceeds to action stage 118. If the user elects to download none of advanced URLs 44 at stage 114, process 100 terminates at end stage 110. Action stage 118 may comprise the main program portion executed by plug-in 48 where the user is provided with advanced URLs 44 during navigation of WEB pages 42 in accordance with the description provided above. Stage 118 continues to execute (e.g., plug-in 48 continues to function) as long as the user remains anywhere within directory tree 80 (e.g., within WEB pages 42 stored on Internet server 32). Once the user leaves directory tree 80 (e.g., by going to a different WEB site), process 100 terminates at end stage 110.

Figure 6:
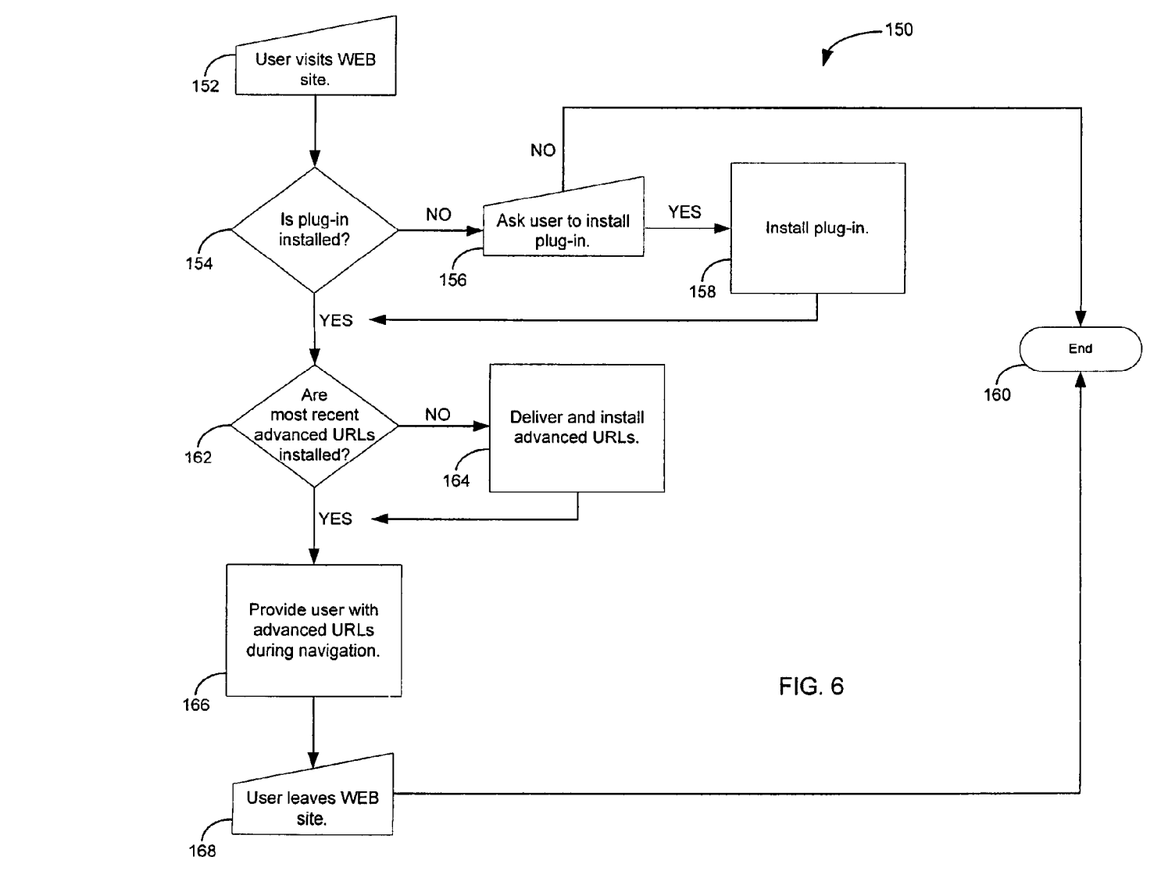
FIG. 6 is a flow diagram illustrating a process in accordance with another aspect of the present invention.

Reference is next made to FIG. 6, which shows an example in flowchart form of a process 150 for the passive delivery method for the downloading of advanced URLs 44 as described above. Process 150 is similar to process 100, except that process 150 does not use servlet 40 and the delivery of advanced URLs 44 to client 24*a* is seamless to the user of the client. Process 150 comprises a user input stage 152, a decision stage 154, a user input stage 156, an action stage 158, an end stage 160, a decision stage 162, an action stage 164, an action stage 166, and a user input stage 168. Process 150 begins at input stage 152 when the user visits WEB page 42 on Internet server 32. At stage 154, Internet server 32 checks client machine 24*a* to see if the appropriate plug-in 48 is installed to implement the present invention. If plug-in 48 is installed, process 150 proceeds to stage 162. If plug-in 48 is not installed, process 150 proceeds to stage 156 and asks the user if plug-in is to be installed on the client machine 24*a*. If the user does not want plug-in 48 installed on client machine 24*a*, process 150 terminates at end stage 160. If the user elects to install plug-in 48, process 150 proceeds to stage 158, installs plug-in 48, and then proceeds to stage 162. At stage 162, Internet server 32 checks to see if the downloading of advanced URLs 44 for WEB pages 42 has already been performed for client 24*a* and if the client has the latest version of the advanced URLs (e.g., have browser 46 data files 50 already been populated with the latest version of the advanced URLs of the WEB pages). If the downloading of advanced URLs 44 has already occurred and data files 50 are up to date, process 150 proceeds to main stage 166. If the downloading of advanced URLs 44 has not yet occurred or data files 50 are not up to date, process 150 proceeds to the stage 164 and delivers advanced URLs of WEB page 42 to the data files of browser 46. In one example, advanced URLs 44 are delivered to plug-in 48 as HTML metatags in an HTML document belonging to WEB page 42. Process 150 then proceeds to action stage 166. Action stage 166 may comprise the main program portion executed by plug-in 48 where the user is provided with advanced URLs 44 to WEB page 42 in accordance with the description provided above. Stage 166 continues to execute (e.g., plug-in 48 may continue to function) as long as the user remains anywhere within the directory tree 80 (e.g., within the WEB pages stored on Internet server 32). Once the user leaves directory tree 80 (e.g., by going to a different WEB site), process 150 terminates at the end stage 160.

The present invention may be embodied in other specific forms without departing from the spirit or characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A computer-implemented method for providing Uniform Resource Locators (URLs) to a WEB browser running on a first computer, the method comprising:

querying the first computer system by a second computer system to determine if a predetermined URL component exists on the first computer system; and sending to the URL component during the browsing session, in response to determining that the URL component exists on the first computer system, advanced URLs pointing to WEB pages associated with a WEB site, wherein a first WEB page is at a level in a page hierarchy of the WEB site and the advanced URL's are configured for automatically displaying to the user in the WEB browser during the browsing session at least a portion of the URLs of the advanced URLs, wherein the displaying of the URLs is limited, when the user is at the first WEB page, to automatically displaying URLs at a next level down from the first WEB page in the page hierarchy, so that the user can navigate the WEB site via the displayed advanced URLs.

2. A computer-implemented method for WEB browsing, the method comprising:

receiving, by a predetermined URL component on a computer of a user, advanced Uniform Resource Locators (URLs) pointing to WEB pages associated with a WEB site, wherein a first WEB page is at a level in a page hierarchy of the WEB site; and automatically displaying to the user in the WEB browser during the browsing session at least a portion of the URLs of the advanced URLs, wherein the displaying of the URLs is limited, when the user is at the first WEB page, to automatically displaying URLs at a next level down from the first WEB page in the page hierarchy, so that the user can navigate the WEB site via the displayed advanced URLs.

3. The method of claim 2, wherein the sending of the advanced URLs is in advance of a request from the first computer system for the pages of the advanced URLs during a browsing session of the first computer system and is in advance of a query from the first computer system of the WEB site during the browsing session.

4. The method of claim 2, wherein the automatically displaying to the user in the WEB browser during the browsing session at least a portion of the URLs of the advanced URLs comprises:

automatically displaying the at least portion of the URLs independently of the user browsing the at least portion of the URLs.

5. The method of claim 2, wherein the receiving, by a computer of a user, advanced URLs pointing to WEB pages associated with a WEB site comprises:

receiving the advanced URLs by a URL component.

6. The method of claim 5, wherein the URL component includes instructions operable with the WEB browser to store the set of advanced URLs in a data file on the user's computer associated with the WEB browser.

7. The method of claim 2, wherein the automatically displaying to the user in the WEB browser during the browsing session at least a portion of the URLs of the advanced URLs comprises:

automatically displaying the at least portion of the URLs in a site-map window associated with the WEB browser.

8. A computer program product having a nontransitory computer readable medium tangibly embodying computer executable instructions for WEB browsing, the computer program product comprising:

computer executable instructions for receiving, by a predetermined URL component on a computer of a user, advanced Uniform Resource Locators (URLs) pointing to WEB pages associated with a WEB site, wherein a first WEB page is at a level in a page hierarchy of the WEB; and computer executable instructions for automatically displaying to the user in the WEB browser during the browsing session at least a portion of the URLs of the advanced URLs, wherein the displaying of the URLs is limited, when the user is at the first WEB page, to automatically displaying URLs at a next level down from the first WEB page in the page hierarchy, so that the user can navigate the WEB site via the displayed advanced URLs.

9. The computer program product of claim 8, wherein the advanced URLs are sent to the user's computer in advance of the user requesting the pages of the advanced URLs during a browsing session and in advance of the user querying the WEB site during the browsing session.

10. The computer program product of claim 8, wherein the automatically displaying to the user in the WEB browser during the browsing session at least a portion of the URLs of the advanced URLs comprises:

automatically displaying the at least portion of the URLs independently of the user browsing the at least portion of the URLs.

11. The computer program product of claim 8, wherein the receiving, by a computer of a user, advanced URLs pointing to WEB pages associated with a WEB site comprises:

receiving the advanced URLs by a URL component.

12. The computer program product of claim 11, wherein the URL component includes instructions operable with the WEB browser to store the set of advanced URLs in a data file on the user's computer associated with the WEB browser.

13. The computer program product of claim 8, wherein the automatically displaying to the user in the WEB browser during the browsing session at least a portion of the URLs of the advanced URLs comprises:

automatically displaying the at least portion of the URLs in a site-map window associated with the WEB browser.

14. A computer system for a user, the computer system comprising:

a memory for storing data and computer code; and a processor for executing the computer code, the computer code comprising:

computer code for receiving, by a predetermined URL component on a computer of a user, advanced Uniform Resource Locators (URLs) pointing to WEB pages associated with a WEB site, wherein a first WEB page is at a level in a page hierarchy of the WEB; and computer code for automatically displaying to the user in the WEB browser during the browsing session at least a portion of the URLs of the advanced URLs, wherein the displaying of the URLs is limited, when the user is at the first WEB page, to automatically displaying URLs at a next level down from the first WEB page in the page hierarchy, so that the user can navigate the WEB site via the displayed advanced URLs.

15. The system of claim 14, wherein the advanced URLs are sent to the user's computer in advance of the user requesting the pages of the advanced URLs during a browsing session and in advance of the user querying the WEB site during the browsing session.

16. The system of claim 14, wherein the automatically displaying to the user in the WEB browser during the browsing session at least a portion of the URLs of the advanced URLs comprises:
  automatically displaying the at least portion of the URLs independently of the user browsing the at least portion of the URLs.

17. The system of claim 14, wherein the receiving, by a computer of a user, advanced URLs pointing to WEB pages associated with a WEB site comprises:
  receiving the advanced URLs by a URL component.

18. The system of claim 17, wherein the URL component includes instructions operable with the WEB browser to store the set of advanced URLs in a data file on the user's computer associated with the WEB browser.

19. The system of claim 14, wherein the automatically displaying to the user in the WEB browser during the browsing session at least a portion of the URLs of the advanced URLs comprises:
  automatically displaying the at least portion of the URLs in a site-map window associated with the WEB browser.

\* \* \* \* \*